G. W. HERING.
MOLD FOR MOLDING CONCRETE.
APPLICATION FILED JUNE 30, 1911.

1,059,871.

Patented Apr. 22, 1913.

WITNESSES

INVENTOR
George W. Hering
BY
ATTORNEYS

UNITED STATES PATENT OFFICE.

GEORGE WASHINGTON HERING, OF LARCHMONT, NEW YORK.

MOLD FOR MOLDING CONCRETE.

1,059,871.  Specification of Letters Patent.  Patented Apr. 22, 1913.

Application filed June 30, 1911. Serial No. 636,210.

*To all whom it may concern:*

Be it known that I, GEORGE W. HERING, a citizen of the United States, and a resident of Larchmont, in the county of Westchester and State of New York, have invented a new and Improved Mold for Molding Concrete, of which the following is a full, clear, and exact description.

This invention relates to a new and improved mold for molding concrete, cement or the like.

An object of this invention is to provide a mold having collapsible cores whereby a concrete or cement shell may be formed and the core and mold removed without disturbing the shell.

A further object of this invention is to provide a mold with a collapsible core, the core being connected to the mold, so that the movement of the latter will actuate the former to move the parts thereof out of contact with the shell or core formed.

A still further object of this invention is to provide a new and improved method of molding concrete, which consists broadly in forming a preliminary shell of relatively dry concrete, and subsequently filling the same with relatively wet concrete, whereby a wall is formed which will have a smooth, attractive finish, and further, whereby the mold can be removed immediately.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1:
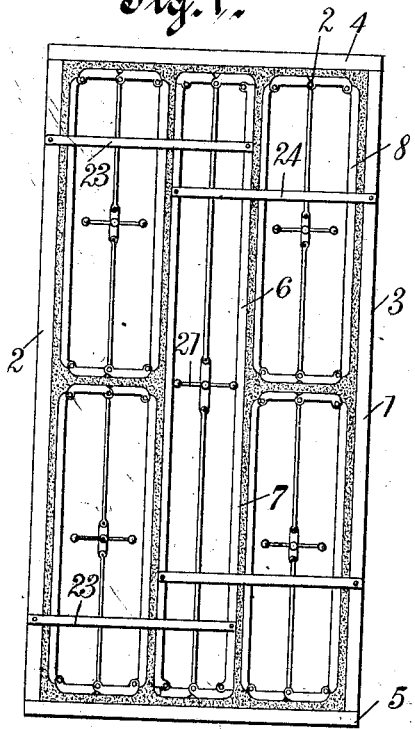
Figure 4:
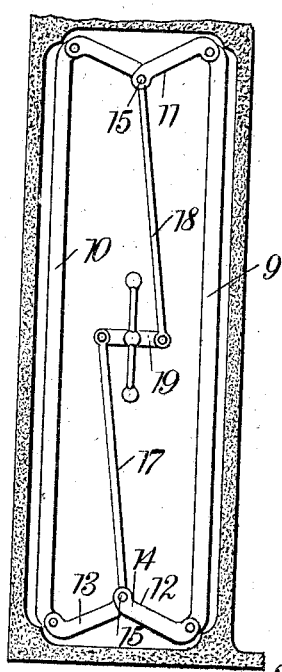
Figure 3:
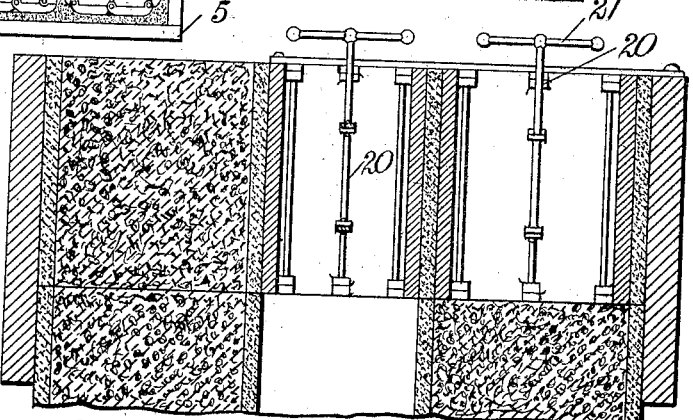
Figure 2:
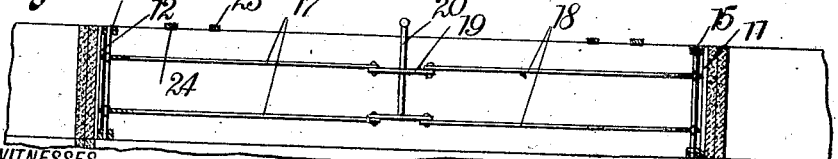

Figure 1 is a top plan view; Fig. 2 is a vertical longitudinal section through the air-space core portion of the mold; Fig. 3 is a vertical transverse section showing one of the cells filled and others with the core molds in place; and Fig. 4 is a fragmentary enlarged top plan view, showing the action in removing one of the cores of the mold.

Referring more particularly to the separate parts of this invention as embodied in the form shown in the drawings, 1 indicates the body of the mold, which may be in the form of a frame embodying sides 2 and 3, which may be movable relative to the ends 4 and 5.

For the purpose of forming cells, in forming a wall or the like, there may be provided one or more cores or core molds 6. In this instance five are shown, of which a long intermediate one, indicated at 7, may be utilized to form the air-space in the wall, and supplementary cores 8 may be used to form the cells in the wall which are to be subsequently filled in accordance with my improved method.

The cores 6 are preferably collapsible, and inasmuch as they are all of the same character, only one will be described. It will be seen by reference to Fig. 4 that each core comprises sides 9 and 10, pivotally connected at their ends to ends of the core 11 and 12. These ends are preferably formed in sections 13 and 14, which are pivoted on the one hand to the sides, and on the other hand to each other, as at 15. The points of pivotal connection of the sections of the ends are connected pivotally to links 17 and 18, which in turn are pivotally connected to bars 19. The bars 19 are secured to a shaft, which may be rotated by a handle 21. It will be seen that when the handle 21 is rotated from the position shown in Fig. 1 to the position shown in Fig. 4, the pivotal points 15 will be drawn nearer the center of the core, so that the sections will be swung relative to each other a sufficient amount to draw the sides 9 and 10 toward each other, out of contact with the shell of concrete formed.

It will be noted that the corners of the sides 9 and 10 and of the ends 11 and 12 are rounded so that they will readily come away from the shell of concrete. In order to allow for the pivotal movement of the sections of the ends, they are rabbeted or have their corners cut away, as indicated at 22.

It may be desirable to actuate the sides 2 and 3 of the body portion of the mold at the same time that one of the cores is actuated, for example, the main core 7, which forms the air-shaft or space in the wall. For this purpose, the sides of this core may be connected to the sides 2 and 3 of the body portion of the mold by means of links 23 and 24. It will be noted that the links 23, of which there are preferably a plurality are connected to the side of the body portion farthest away from the side of the core to which they are secured. The same is true of the links 24. This renders the action simultaneous, so that the connected sides of the core and body portion move in the same direction away from the shell of the wall.

In the drawings, the mold is shown as forming a corner section of the wall. The mold, with its cores, is supported in any suitable manner on the tier previously formed, and the cores arranged in proper spaced relation from the body of the mold. The space between the various cores and the body portion or frame is then filled with comparatively dry concrete or cement, that is to say, the concrete or cement or other plastic material is just moistened, so that it will readily dry out and set. After the space between the frame or body portion of the mold and the cores has been filled, the cores may be removed immediately, and the cells formed in the wall may be filled with comparatively wet cement or concrete. The center cell, however, may be left empty to form an air-space. It will be seen that after this has been accomplished, the main frame and the central core can be removed by turning the handle 21, and that the sides of the body portion of the mold and the sides of the core will be simultaneously moved away from the wall thus formed. This operation can be performed much more quickly than in the ordinary process of molding, as the outer shell of the wall will be comparatively dry and hard, while the inner cores of the wall, formed by filling the cells, will be still wet. The section of the wall thus formed can be left to set, and one of the end pieces 4 of the outer frame removed, and the mold shifted along to form the next section of the tier.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. A mold, comprising an outer frame and an inner core, said inner core being spaced apart from said outer frame at a plurality of points, so that a wall of concrete may be filled in between them, and comprising sides and ends movably connected together so as to be capable of collapsing toward each other out of contact with said wall, said outer frame comprising relatively movable members, and connections between some of the elements of said core and some of the members of said frame, whereby the movement of the one will be controlled from the other.

2. A mold, comprising an outer frame and an inner core, said inner core being spaced apart from said outer frame at a plurality of points, so that a wall of concrete may be filled in between them, and comprising sides and ends movably connected together so as to be capable of collapsing toward each other out of contact with said wall, said outer frame comprising relatively movable members, connections between some of the elements of said core and some of the members of said frame, whereby the movement of the one will be controlled from the other, and means for moving the elements of said core relative to each other to collapse and expand the same.

3. A core, comprising sides, ends formed of sections pivoted together and to the sides, an operating shaft having oppositely arranged members projecting therefrom, and links pivoted to the pivots connecting the end sections and to the members of the shaft.

4. A core, comprising sides, ends embodying a plurality of sections, said sections being pivotally connected to each other and pivotally connected to said sides, links connected to said ends at the pivotal junctions of said sections, and means for manipulating said links so as to pivot said sections relative to each other, whereby said sides are manipulated toward and from each other.

5. A core, comprising sides, ends embodying a plurality of sections, said sections being pivotally connected to said sides, and pivotally connected to each other, links connected to said ends at the pivotal junctions of said sections, and means for manipulating said links so as to pivot said sections relative to each other, whereby said sides are manipulated toward and from each other, said end projecting beyond the ends of said sides so as to leave a space into which said sides can move in collapsing toward each other.

6. In a concrete mold, the combination with an outer frame, embodying relatively movable sides and ends, of an inner core comprising sides, ends pivotally connected to said sides, said ends embodying a plurality of sections movable relative to each other, means for manipulating said sections relative to each other so as to move said last-mentioned sides toward and from each other, and connecting links between the sides of said core and the sides of said frame, whereby the latter will be manipulated from the former.

7. A concrete mold, comprising a frame, having movable members, a central collapsible core extending the length of the frame, a plurality of collapsible cores on each side of the central core, and means whereby members of the frame will be moved outwardly when the central core is collapsed.

8. A concrete mold, comprising a frame having movable sides, a central collapsible core formed of sides and jointed ends hinged to the sides, a plurality of collapsible cores at each side of the central core, and links
5 connecting the sides of the central core with the sides of the frame.

In testimony whereof I have signed my name to this specification in the presence of two subscribing witnesses.

GEORGE WASHINGTON HERING.

Witnesses:
 H. WHITING,
 PHILIP D. ROLLHAUS.